United States Patent [19]

Kim

[11] 4,442,132
[45] Apr. 10, 1984

[54] LIGHT BAKERY PRODUCTS FOR DIABETICS AND METHOD FOR THE PREPARATION OF THESE PRODUCTS

[75] Inventor: Jong C. Kim, Bennekom, Netherlands

[73] Assignee: C.V. Chemie Combinatie Amsterdam C.C.A., Gorinchem, Netherlands

[21] Appl. No.: 403,718

[22] Filed: Jul. 30, 1982

Related U.S. Application Data

[63] Continuation of Ser. No. 260,997, May 6, 1981, abandoned, which is a continuation of Ser. No. 92,497, Nov. 8, 1979, abandoned.

[30] Foreign Application Priority Data

Nov. 13, 1978 [NL] Netherlands ......................... 7811204

[51] Int. Cl.$^3$ ........................ A21D 13/00; A23L 1/32
[52] U.S. Cl. .................................. 426/549; 426/614; 426/658; 426/804
[58] Field of Search ............... 426/549, 558, 580, 656, 426/658, 629, 614, 804, 653, 622

[56] References Cited

FOREIGN PATENT DOCUMENTS 1442044 10/1968 Fed. Rep. of Germany ...... 426/804
2438597 2/1976 Fed. Rep. of Germany ...... 426/549

*Primary Examiner*—Raymond N. Jones
*Assistant Examiner*—Elizabeth A. Hatcher
*Attorney, Agent, or Firm*—Martin Smolowitz

[57] ABSTRACT

The products contain less than 10% by weight of digestible carbohydrate and are prepared in the conventional way from a dough or batter comprising egg in the form of whole egg or egg albumin, 2–30% by weight of flour substitute such as calcium caseinate, sodium caseinate, ammonium caseinate, acid caseinate, soy protein and the like, of which at least 50% by weight is supplied by calcium caseinate, 15% by weight of wheat flour which is present in an amount less than the amount of flour substitute, 3–40% by weight of minced nuts, 5–50% by weight of sugar alcohol selected from lactitol, sorbitol, and xylitol, and 0% by weight of sugar. The use of lactitol as the sugar alcohol provides crispy products which maintain their crispness for several months when protected from moisture.

5 Claims, No Drawings

LIGHT BAKERY PRODUCTS FOR DIABETICS AND METHOD FOR THE PREPARATION OF THESE PRODUCTS

This is a continuation of application Ser. No. 260,997, filed May 6, 1981, which is a continuation of application Ser. No. 92,497, filed Nov. 8, 1979, both abandoned.

The invention relates to light bakery products having a low digestible carbohydrate content as well as to a method for the preparation of these bakery products which are very well suited for consumption by diabetics.

There have already been described several methods for the preparation of bakery products for diabetics.

U.S. Pat. No. 3,658,553 discloses a method for the preparation of a dry cake mix in which sorbitol replaces the sugar. This cake mix however contains about 40% of a wheat flour having a high starch content (about 85 weight % on a dry basis) whereby the mix may certainly not be considered to be suitable for diabetics.

Dutch Patent Application No. 75.09437 discloses the preparation of a low carbohydrate bakery product for diabetics in which wheat gluten, soya protein and a thickening agent are used instead of flour.

German Offenlegungsschriften Nos. 2,530,164 and 1,930,644 and British Patent Specification No. 462,986 also describe examples of bakery products for diabetics with a lower digestible carbohydrate content.

Dutch Patent Application No. 77,04281 laid open for public inspection discloses a foodstuff to be used as a protein source (thus not intended for diabetics) that comprises at least 60% of protein consisting of albumin and caseinate, preferably sodium caseinate.

All the above mentioned methods however entail evident disadvantages. Most of the products do not satisfy the requirement of a digestible carbohydrate content that is as low as possible, at least less than 10% by weight, while moreover the taste and texture of these diabetic products are clearly not as good as those of similar bakery products as produced commonly.

It is only possible to attain sufficiently low edible carbohydrate contents in bakery products by replacing both the flour and the sugar by substitutes. When replacing the flour wholly or to a great extent by high protein products there clearly occurs a deterioration of texture and taste. This may be improved by adding minced nuts. The stability of the dough or batter is however decreased considerably by such an addition.

It has now been found that when starting from a blend comprising 2–30% by weight of a flour substitute (of which at least 50% by weight, preferably at least 80% by weight is calcium caseinate), 0–15% by weight of wheat flour, 3–40% by weight of minced nuts, 5–50% by weight of a sugar alcohol and 0% by weight of sugar there are obtained bakery products containing at most 10% by weight of digestible carbohydrates and having properties as regards texture, specific volume and shelf life that are substantially similar to those of comparable products for non-diabetics.

The term minced nuts as used herein is meant to include materials derived from nuts by any way of comminution such as for instance coco flakes.

Moreover it is of great advantage that the weight percentage of digestible carbohydrates is that low and may even be only 2% by weight.

It now became apparent that in spite of the addition of minced or comminuted nuts there may be prepared a dough or batter having sufficient stability and sufficient processing tolerance for a preparation method on a technical scale when the flour substitute consists of at least 50% of calcium caseinate. The calcium caseinate (calcium paracaseinate of rennet casein is also considered to be a calcium caseinate) may be added as such or may be formed in situ starting from other casein compositions, for instance acidic casein, sodium caseinate or ammonium caseinate and a soluble calcium salt (for instance $CaCl_2$).

Suitable sugar substitutes according to the invention are lactitol, sorbitol and xylitol of which lactitol (systematic name 4-β-D galactopyranosyl-D-sorbitol) is preferred. Lactitol is a sugar alcohol derived from lactose. Lactitol may be prepared as follows.

Lactose monohydrate is dissolved in water in a concentration of 30–40% by weight whereupon after adjustment to a pH between 7.0 and 10.0 it is hydrogenated by means of hydrogen under relatively high pressure (about 40 atmospheres) at 80°–120° C. using Raney nickel as the catalyst. Upon completing the reaction the catalyst is separated by sedimentation. The hydrogenated liquid is than purified and concentrated by evaporation under reduced pressure. The concentrated solution is crystallized by cooling whereupon the crystalline lactitol monohydrate is separated by centrifuging.

Both the crystalline lactitol monohydrate and the lactitol mother liquor (concentration of 64% by weight) may be used in the preparation of bakery products according to the invention.

Lactitol monohydrate is a white, odorless non-hygroscopic crystalline product having a sweet taste.

Lactitol is a suitable sweetening agent for diabetics because the consumption of lactitol does not induce an increase of the glucose or insulin level of the blood.

The caloric value of lactitol amounts only to maximally half of that of saccharose so that in diabetic products this sugar alcohol is preferred to sorbitol and xylitol both having the same caloric value as saccharose.

It became apparent that the use of calcium caseinate either together with other protein products as the flour substitute and lactitol as the sugar substitute are preeminently suitable for the preparation of crisp products. When employing more hygroscopic polyols such as sorbitol and xylitol, crisp products can not be prepared, bakery products prepared with the aid of sorbitol or xylitol becoming soft very soon after the preparation thereof.

The use of calcium caseinate alone or together with other protein products and sorbitol leads however to good results in soft bakery products such as sponge cake.

The results obtained by substituting the main part of the flour in these products by calcium caseinate either alone or together with other protein products were truly surprising. Bakery products thus prepared were very light and porous, had excellent texture and could be kept very well. The results obtained were considerably better than those obtained with other flour substitutes such as sodium caseinate, wheat gluten and soya protein (which may however be used in minor concentrations together with calcium caseinate).

The flour substitute and the sugar alcohol may be formulated with the other starting materials and blended to a dough or batter in accordance with the usual bakery techniques and then be baked at about 180° C. for about 20 minutes. Upon cooling the biscuits or cakes are wrapped in a moisture proof packing.

In accordance with the invention there may be prepared for example nut cookies, biscuit savoye, chocolate coated cakes, and pie crust.

The invention will be elucidated with reference to a number of examples disclosing some embodiments of the invention without restricting the spirit and the scope thereof as indicated in the subsequent claims.

EXAMPLE I

| Biscuit savoye | |
|---|---|
| Formula: | |
| Wheat flour | 7.0 parts by weight |
| calcium caseinate | 10.9 parts by weight |
| egg, fresh* | 51.3 parts by weight |
| saccharin, solution (1.5 weight %) | 0.6 part by weight |
| kitchen-salt | 0.6 part by weight |
| lactitol monohydrate | 21.6 parts by weight |
| vanilla | 0.2 part by weight |
| batter stabilizer | 1.9 parts by weight |
| coco flakes | 5.9 parts by weight |
| Total | 100.0 |

*instead of fresh egg there may also be used egg albumin.

Preparation

The starting materials are kneaded in a planetary mixer at 220 rotations per minute for 10 minutes until a homogeneous batter is obtained. The obtained batter is extruded either manually or by means of an extrusion machine into the desired form. The cakes are baked at 180° C. for 17 minutes. Upon cooling the cakes are packaged in a moisture tight wrapping.

Description of the product

The cakes thus obtained are light (specific volume 6.22 cm$^3$/g) and very crisp and tender. When packaged well the product keeps its crispness for many months.

The digestible carbohydrate content is 9.0% by weight.

EXAMPLE II

| Nut cookies | |
|---|---|
| Formula: | |
| 1. Peeled and minced hazel-nuts | 28.8 parts by weight |
| 2. Lactitol monohydrate | 10.1 parts by weight |
| 3. Wheat flour | 0.8 part by weight |
| 4. Calcium caseinate | 2.2 parts by weight |
| 5. Egg, fresh* | 48.0 parts by weight |
| 6. Lactitol | 9.6 parts by weight |
| 7. Kitchen-salt | 0.5 part by weight |
| Total | 100.0 parts by weight |

*instead of fresh egg there may also be used egg albumin.

Preparation a. The starting materials 1 and 2 are blended and ground by means of an almond mill. The grinding operation should be carried out gradually in order to avoid the liberation of oil from the nuts as much as possible. During the final grinding step the clearance between the friction rollers of the grinder is about 0.7 mm.

b. The starting materials 4 to 7 inclusive are whipped in a planetary mixer at 300 rotations per minute for 3 minutes.

c. The ground blend of hazel-nuts and lactitol (a) and the wheat flour are blended with the mixture (b).

d. The obtained mixture (c) is extruded manually or by means of an extruding machine into the desired shape.

e. Cakes are baked at 180° C. for 25 minutes.

f. Upon cooling the cakes are packaged in a moisture proof wrapping.

Description of the product

The cakes thus obtained are light (specific volume 4.73 cm$^3$/g) and very crisp. When packaged well the product keeps its crispness for many months.

The digestible carbohydrate content is 4.1% by weight.

EXAMPLE III

| Chocolate coated cakes | |
|---|---|
| Formula: | |
| Wheat flour | 7.3 parts by weight |
| Calcium caseinate | 14.7 parts by weight |
| Sorbitol solution (70%) | 27.0 parts by weight |
| Egg, fresh* | 45.0 parts by weight |
| Saccharin solution (1.5 weight %) | 0.7 part by weight |
| Vanilla | 0.1 part by weight |
| Kitchen-salt | 0.6 part by weight |
| Batter stabilizer | 2.3 parts by weight |
| Coco flakes | 2.3 parts by weight |
| Total | 100.0 parts by weight |

Chocolate coating: about 1 g/1.5 g Cake.
*instead of fresh egg there may also be used egg albumin.

Preparation

Apart from the chocolate coating the starting materials are kneaded in a planetary mixer at 220 rotations per minute for 10 minutes until a homogeneous batter is obtained. The batter is extruded either manually or by means of an extrusion machine into the desired shape.

The cakes are baked at 180° C. for 14 minutes whereupon they are left to cool down.

The chocolate coating is prepared from 40 parts by weight of lactitol monohydrate (particle size 150 microns), 45 parts by weight of cocoa-mass and 15 parts by weight of cocoa-fat by blending, grinding and conching in the usual way.

The cooled cakes are covered with this lactitol chocolate at 36° C.

Upon cooling the cakes are packaged in a moisture proof wrapping.

Description of the product

The cakes thus obtained are light and tender and as regards the organoleptic properties comparable with similar products containing sugar.

The digestible carbohydrate content amounts to 5.8% by weight.

The effect of using other protein products together with calcium caseinate with respect to the stability and performance of the batter or dough as well as the quality of the baked product will be apparent from the following examples.

Comparison a

In accordance with the formula of Example I there were baked biscuit savoye. In all instances the amount of flour substitute was 10.9% by weight.

| Ca—caseinate/ protein product ratio in flour substitute | Specific batter volume after a resting period of | | | | Batter performance after a resting period of 20 minutes | Quality of the baked product |
|---|---|---|---|---|---|---|
| | 0 min | 10 min | 20 min | 30 min | | |
| Ca—caseinate / Na—caseinate | | | | | | |
| 100/0 | 1.72 | 1.70 | 1.66 | 1.66 | good processability | good |
| 50/50 | 1.42 | 1.39 | 1.37 | 1.35 | not processable | — |
| 80/20 | 1.32 | 1.30 | 1.30 | 1.28 | not processable | — |
| Ca—caseinate / defatted soya | | | | | | |
| 100/0 | 1.72 | 1.70 | 1.66 | 1.66 | good processability | good |
| 50/50 | 1.35 | 1.35 | 1.35 | 1.32 | moderate processability | moderate, not brittle |
| 80/20 | 1.32 | 1.31 | 1.27 | 1.27 | moderate processability | sufficient, not brittle |
| Ca—caseinate / soya-isolate* | | | | | | |
| 100/0 | 1.72 | 1.70 | 1.66 | 1.66 | good processability | good |
| 50/50 | 1.35 | 1.55 | 1.34 | 1.33 | moderate processability | moderate, not brittle |
| 80/20 | 1.29 | 1.29 | 1.26 | 1.25 | moderate processability | moderate, not brittle |

The effect of the addition of protein product on the cakes thus obtained.

From table A it is apparent that in this baked product the replacement of 20% by weight of the calcium caseinate in the flour substitute already causes unsatisfactory results.

*the employed soya-isolate was prepared as follows: defatted soya-flakes were extracted in a mild alkaline medium whereupon the extract was acidified to a pH of 4.5. The precipitated protein fraction was separated, washed and redispersed in water (pH of 7.0). This dispersion was finally spray dried to form a powder, the soya-isolate.

Comparison b

In accordance with the formula of Example II nut cookies were baked. In all instances the amount of flour substitute was 2.2% by weight.

The effect of the addition of protein products upon baked nut cookies.

From table B it is apparent, that in nut cookies dependent on the protein product up to 50% of the calcium caseinate can be replaced by other protein products without loss of processability and quality of the cookies. Higher percentages of the replacement cause a deterioration of the results.

In the comparison below it is demonstrated that crisp baked products can not be prepared when using sorbitol instead of lactitol as the sugar substitute.

Comparison c

In accordance with the formula of Example II with the only difference that sorbitol was used instead of lactitol there were baked nut cookies entirely in accordance with the production method as described in Example II.

The obtained products were light and porous (specific volume 4.42 cm$^3$/g) but were subject to a very rapid deterioration of the crispness and were already soft after a lapse of some hours.

| Ca—caseinate/ protein product ratio in flour substitute | Specific batter volume after a resting period of | | | | Batter performance after a resting period of 20 minutes | Quality of the baked product |
|---|---|---|---|---|---|---|
| | 0 min | 10 min | 20 min | 30 min | | |
| Ca—caseinate / Na—caseinate | | | | | | |
| 100/0 | 3.14 | 2.90 | 2.37 | 2.13 | good processability | good |
| 50/50 | 4.82 | 4.65 | 3.94 | 3.20 | amply sufficient | sufficient, not brittle |

-continued

| Ca—caseinate/ protein product ratio in flour substitute | Specific batter volume after a resting period of | | | | Batter performance after a resting period of 20 minutes | Quality of the baked product |
|---|---|---|---|---|---|---|
| | 0 min | 10 min | 20 min | 30 min | | |
| | | | | | processability | |
| 25/75 | 5.53 | 4.18 | 3.47 | 3.04 | not processable | — |
| Ca—caseinate / defatted soya | | | | | | |
| 100/0 | 3.14 | 2.90 | 2.37 | 2.13 | good processability | good |
| 50/50 | 3.58 | 3.33 | 3.20 | 2.73 | good processability | moderate, not brittle |
| 80/20 | 3.44 | 3.32 | 3.00 | 2.57 | good processability | good |
| Ca—caseinate / soya-isolate* | | | | | | |
| 100/0 | 3.14 | 2.90 | 2.37 | 2.13 | good processability | good |
| 50/50 | 3.46 | 3.25 | 2.95 | 2.33 | good processability | good |
| 20/80 | 4.01 | 3.35 | 3.06 | 2.49 | sufficient processability | moderate, not brittle |

I claim:

1. Light bakery products for diabetics, having a digestible carbohydrate content of less than 10% by weight and prepared from a dough consisting essentially of a major amount of egg in the form of whole egg or egg albumin, 2-30% by weight of a protein-containing flour substitute of which at least 50% by weight is supplied by calcium caseinate, wheat flour in an amount up to 15% by weight of the total mixture, 3-40% by weight of minced nuts, 5-50% by weight of a sugar alcohol selected from the group consisting of lactitol, sorbitol and xylitol, and 0% by weight of sugar, and wherein the weight % of weight flour is less than the weight % of flour substitute.

2. The products of claim 1, wherein in that the calcium caseinate is added as such or formed in situ from acid casein, alkal metal caseinate or ammonium caseinate and a soluble calcium salt.

3. The products of either one of claims 1 and 2, wherein the flour substitute is selected from the group consisting of alkali metal caseinate, ammonium caseinate, acid caseinate and soya-protein in addition to calcium caseinate.

4. The products of claim 3, wherein the sugar alcohol is lactitol, thereby producing a crispy product which maintains its crispness for several months when protected from moisture.

5. A method for the production of light crispy baked products for diabetics, comprising at most 10% by weight of digestible carbohydrates, which comprises baking a dough dough consisting essentially of a major amount of egg in the form of whole egg or egg albumin, 2-30% by weight of protein-containing flour substitute consisting of at least 50% by weight of calcium caseinate, wheat flour in an amount up to 15% by weight of the total mixture, 3-40% by weight of minced nuts, 5-50% by weight of lactitol and 0% by weight of sugar and wherein the weight % of wheat flour is less than the weight % of flour substitute.

* * * * *